United States Patent
Künzel et al.

(10) Patent No.: US 6,903,529 B2
(45) Date of Patent: Jun. 7, 2005

(54) METHOD AND APPARATUS FOR DAMPING MECHANICAL OSCILLATIONS OF A SHAFT IN MACHINE TOOLS, MANUFACTURING MACHINES AND ROBOTS

(75) Inventors: Stefan Künzel, Erlangen (DE); Theo Reichel, Forchheim (DE); Elmar Schäfers, Nürnberg (DE); Andreas Uhlich, Wendelstein (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/677,127

(22) Filed: Oct. 1, 2003

(65) Prior Publication Data

US 2004/0135535 A1 Jul. 15, 2004

(30) Foreign Application Priority Data

Oct. 2, 2002 (DE) .......................................... 102 46 093

(51) Int. Cl.$^7$ ............................................... G05B 5/01
(52) U.S. Cl. ..................... 318/611; 318/609; 318/610; 318/615
(58) Field of Search ................................ 318/602–632, 318/430–434, 560, 561, 570–573; 180/65.8

(56) References Cited

U.S. PATENT DOCUMENTS

| | | | | |
|---|---|---|---|---|
| 4,195,337 A | * | 3/1980 | Bertrand et al. ............... 700/31 |
| 4,267,496 A | * | 5/1981 | Ivanov et al. ................ 318/615 |
| 4,395,904 A | * | 8/1983 | Ivanov et al. ............... 73/118.1 |
| 4,630,187 A | * | 12/1986 | Henze ........................... 363/41 |
| 4,792,715 A | * | 12/1988 | Barsky et al. .......... 310/316.01 |
| 4,980,617 A | * | 12/1990 | Tajima et al. ................ 318/254 |
| 5,304,751 A | * | 4/1994 | Skalski et al. ............... 187/393 |
| 5,404,418 A | * | 4/1995 | Nagano ....................... 388/806 |
| 5,443,566 A | * | 8/1995 | Rushmer et al. ............. 212/275 |
| 5,459,383 A | * | 10/1995 | Sidman et al. .............. 318/611 |
| 5,545,957 A | * | 8/1996 | Kubo et al. .................. 318/432 |
| 5,691,614 A | * | 11/1997 | Takeishi ...................... 318/561 |
| 6,072,297 A | * | 6/2000 | Xu et al. ...................... 318/630 |
| 6,114,825 A | * | 9/2000 | Katz ............................ 318/615 |
| 6,196,345 B1 | * | 3/2001 | Lyons et al. ................ 180/65.8 |

FOREIGN PATENT DOCUMENTS

DE 196 20 439 C2 12/1996
JP 01304511 A * 12/1989 ............ G05D/3/12

* cited by examiner

*Primary Examiner*—Paul Ip
(74) *Attorney, Agent, or Firm*—Henry M. Feiereisen

(57) ABSTRACT

Damping of mechanical oscillation in a shaft that is provided by feedback wherein the output signals of multiple feedback devices are negatively coupled and added to a desired speed signal of a motor speed controller of the driving motor is disclosed. At least one sensor and/or measuring system can be provided for measuring an actual position value. The actual speed of the shaft can be determined by differentiation from the shaft position value measurements or by integration from the shaft acceleration measurements. The measured or actual speed of the shaft can be supplied as an input signal to each feedback element. Each feedback element is specifically tuned to an oscillation frequency range of the shaft that is to be damped. The invention provides an easy and cost-effective way of damping mechanical oscillations that have limited frequency ranges.

22 Claims, 1 Drawing Sheet

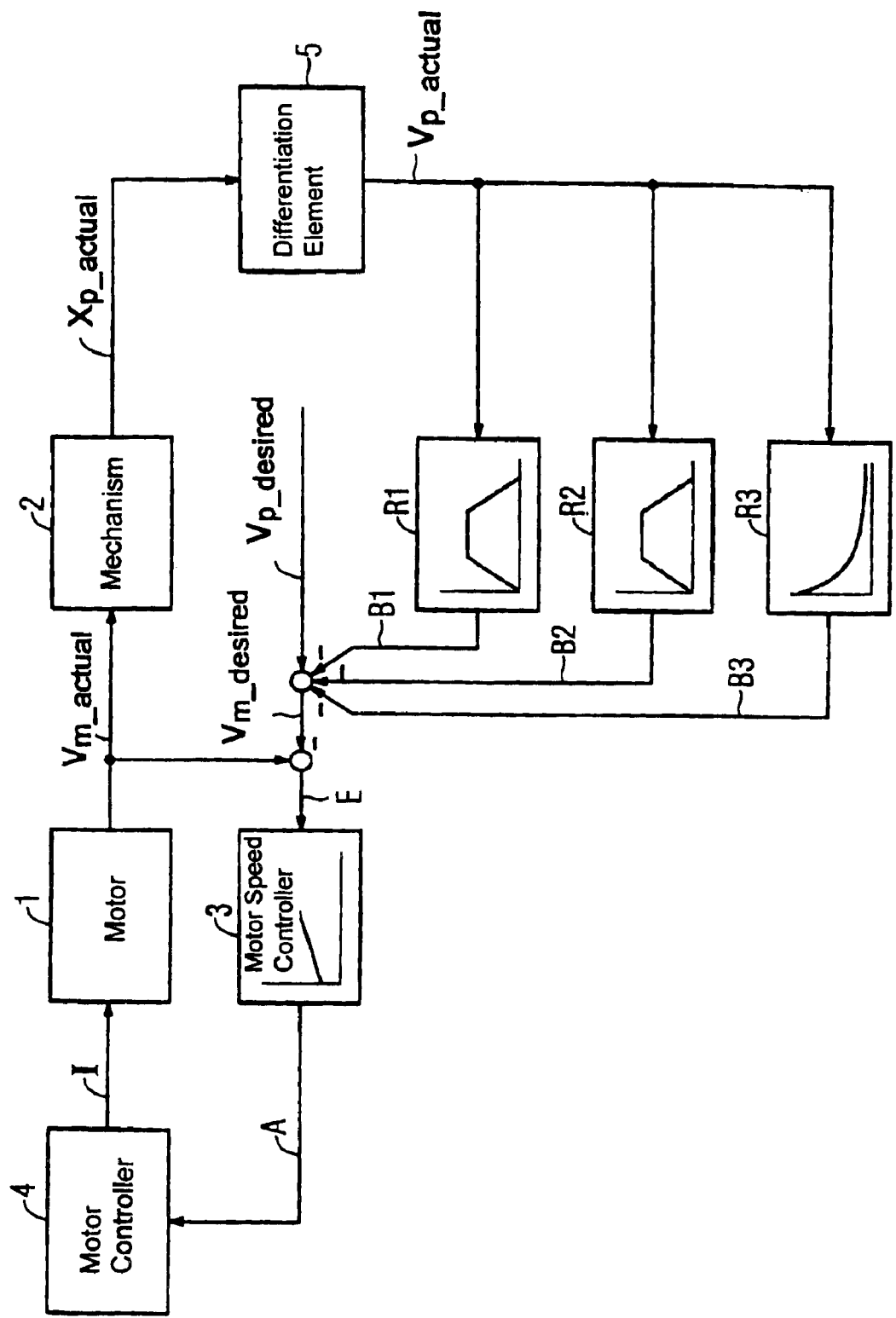

METHOD AND APPARATUS FOR DAMPING MECHANICAL OSCILLATIONS OF A SHAFT IN MACHINE TOOLS, MANUFACTURING MACHINES AND ROBOTS

CROSS-REFERENCES TO RELATED APPLICATIONS

This application claims the priority of German Patent Application, Ser. No. 102 46 093.0, filed Oct. 2, 2002, pursuant to 35 U.S.C. 119(a)–(d), the disclosure of which is incorporated herein by reference.

BACKGROUND OF THE INVENTION

The present invention relates to a method and apparatus for damping mechanical oscillations of shafts of a machine tool, manufacturing machine or robot by providing feedback elements that apply a negative feedback output signal from each feedback element to the desired rotational speed value of a speed controller for a motor driving the shaft.

Modern machine tools, manufacturing machines or robots frequently produce undesired oscillations, particularly about the shafts and in particular the NC-shafts (numerical-control shafts) of the machine. It is to be understood by persons skilled in the art that the term "machine" is used here in a generic sense and the principles described in the following description with respect to machine are equally applicable to robots. The oscillations are caused by poorly damped mechanical resonances in the mechanical system of the machine. As a result, the speed of the shaft is increased above or reduced below the point where the undesired resonance occurs. Such resonance produces undesirable chatter marks that mechanically strain the machine, and leads to a decrease in the processing accuracy. As a rule, the mechanical system of the machine has several areas of resonance, which have respective limited frequency ranges.

In a conventional drive controller, a superordinated position-control circuit provides a desired motor speed to a subordinated speed controller for rotation of the machine shafts. In the event a respective gain is selected for the speed controller, the mechanical resonances of the mechanical system of the machine are clearly noticeable in the form of drops and increases in the amplitude excursions of the reference frequency response in the speed control circuit. Only a very limited damping of these resonance oscillations is possible with the position control means available. This conventional approach is unsuitable for implementing an effective damping of the oscillations caused by mechanical resonance. The result is inadequate machine dynamics and chatter marks, as well as the gain in the position controller being limited to just a small adjustable range.

German Pat. No. DE 196 20 439 C2 discloses a method of damping mechanical oscillations in machine tools and robots, saw-tooth oscillations in particular, as well as rotational oscillations. Two control variables are determined by two acceleration detectors and fed back via the controller to a drive controller as a desired value.

It would therefore be desirable and advantageous to provide an improved method and apparatus of damping mechanical oscillations, to obviate prior art shortcomings and to exhibit limited oscillation frequency ranges for shafts of machine tools, manufacturing machines or robots, while being simple and cost-efficient.

SUMMARY OF THE INVENTION

According to one aspect of the present invention, a method of damping the mechanical oscillations of at least one shaft in a machine tool, manufacturing machine or robot, includes the steps of measuring an actual position value of a shaft using at least one sensor and/or measuring system, determining an actual speed of the shaft from the actual position value through differentiation, supplying the actual speed of the shaft as an input signal to each of a plurality of feedback elements, with each feedback element providing an output signal from each of the feedback elements that is negatively coupled and applied to a desired speed signal of a motor speed controller for the motor driving the shaft, and tuning each of the feedback elements to a specific oscillation frequency range of the oscillations of the shaft that are to be damped.

According to another feature of the present invention, tuned band-pass or high-pass elements tuned to the respective oscillation frequency range to be damped can be used as feedback elements. Band-pass or high-pass filter elements can easily be implemented using typical mathematical calculation programs in use today. The filter is constructed so as to provide a suitable gain and phase margin in the oscillation frequency range that is to be damped. This determines the range of frequencies that are controlled.

According to another feature of the present invention, a differential element tuned to the respective oscillation frequency range to be damped and having a first-order (DT1) or a differential element having a second-order (DT2) or a higher-order delay can be used. DT1-elements, DT2-elements and differential elements of a higher order, are able to differentiate below a limit frequency and to provide an adequate phase margin in a closed control circuit, thereby protecting the stability of the control circuit. In some instances, it is advantageous if the delay of second-order or higher-order has a slight damping effect and thus produces a rise in the resonance.

According to another feature of the present invention, instead of using the sensor and/or measuring system for measurement of the actual shaft position value, a sensor and/or measuring system can be used for measurement of the shaft acceleration, or the acceleration is determined by second-order differentiation from the shaft position value. The acceleration is then used as an input variable for the respective feedback element. Resonance oscillations are especially easy to detect in the acceleration of the shaft. Acceleration can advantageously be directly measured on the shaft or areas which are caused to oscillate as a consequence of a shaft movement.

According to another feature of the present invention, a proportional element tuned to the respective oscillatory frequency range to be damped and having a first-order delay or a second-order or higher-order delay can be used as a feedback element. Of course, it is also possible to calculate the speed of the shaft from the acceleration by integration and then to use as feedback elements the DT1-elements, DT2-elements and differential elements having a higher-order delay. A drawback of this approach is, however, an increase in computation time compared to a direct processing of the shaft acceleration in the feedback elements. In certain cases, however, this approach may still be advantageous, for example when the use of proportional elements is undesirable.

According to another feature of the present invention, instead of a sensor and/or measuring system for measuring position values for the shaft, a sensor and/or measuring system may conceivably be used as well, for measuring the actual speed of the shaft. The actual speed of the shaft is then fed directly to the feedback elements as an input variable.

The determination of the actual shaft speed by differentiation of the actual position value of the shaft can thus be eliminated by directly measuring the actual speed.

According to another feature of the present invention, in addition to or instead of the sensor and/or measurement system for measurement of the actual shaft position, further sensors and/or measurement systems can be used, especially those for measuring shaft acceleration and/or shaft speed, and the respective measured shaft variable or a calculated variable produced from measured variables is supplied as input variable to a respective one of sets of feedback elements, whereby each of the sets of feedback elements has at least one feedback element. By the use of not just one but multiple measured variables as input variables for a respective separate set of feedback elements, for example an actual position value as well as shaft acceleration, a particularly good damping of the mechanical shaft oscillations can be achieved.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIG. 1 is a schematic block diagram illustrating the components of the subject matter of the present invention:

DETAILED DESCRIPTION OF PREFERRED EMBODIMENTS

The depicted embodiment is to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to FIG. 1, there is shown a schematic block diagram illustrating the components of the subject matter of the present invention. A motor 1 drives a not shown shaft of a machine via a mechanism 2. An actual speed $V_{m\_actual}$ of the motor 1 and an actual position value $X_{p\_actual}$ is measured by a suitable measuring system. The motor speed $V_{m\_actual}$ is controlled by a motor speed controller 3, which has the difference between the motor speed $V_{m\_actual}$ and the desired motor speed $V_{m\_desired}$ as an input variable E and on the output side provides a control output signal A to a motor controller 4 that controls the motor speed $V_{m\_actual}$ through an output current 1.

The motor speed controller 3 may be implemented as a conventional proportional integral-action controller. A desired motor speed position value $V_{p\_desired}$ is given by a superordinated position control circuit (not shown for ease of illustration) for position control of the shaft.

In the exemplified embodiment shown here three oscillation frequency ranges or resonance areas of the mechanical systems of the machine are assumed.

An actual shaft speed $V_{p\_actual}$ is calculated from the actual shaft position value $X_{p\_actual}$ by means of a differentiation element 5 and delivered to the feedback elements R1, R2, R3. The output signals B1, B2, B3 of the feedback elements R1, R2, R3 are negatively coupled and applied to a desired motor speed position value $V_{p\_desired}$, which is generated by a superordinated position control circuit (not shown for ease of illustration), to form on the output side a desired motor speed signal $V_{m\_desired}$.

A feedback element is provided for each oscillation frequency range to be damped. Thus, the assumed three oscillation frequency ranges to be damped in the present exemplified embodiment requires therefore three feedback elements R1, R2, R3. FIG. 1 illustrates the parallel control structure and feedback structure, respectively. To suppress even more oscillation frequency ranges or resonance areas, the arrangement shown is supplemented by further feedback elements or feedbacks connected in parallel and tuned to the respective oscillation frequency ranges to be damped.

When selecting suitable feedback elements, care should be taken to provide them with a suitable gain and phase margin in the range of the oscillations that are to be suppressed. Such a feedback element can readily be realized as a band-pass filter or a high-pass filter, for example, in the form of a finite impulse response or an infinite impulse response filter. Suitable filters can be easily calculated today, or the filter coefficients defined, using commercially available filter design programs. In the design of the feedback element, care should be taken so that the phase margin in the closed control circuit is not too small, otherwise the stability of the control circuit is jeopardized.

An example for use as feedback elements with band-pass response includes differential elements with second-order delays, so-called DT2 elements, which have a transfer function in the form:

$$R(s) = \frac{s}{T^2 s^2 + 2dTs + 1}$$

wherein the parameter "s" relates to the complex circuit frequency while the frequency behavior of the DT2 element can be parameterized with the assistance of the time constant "T" and the damping "d".

Examples for the transfer function of high-pass filters include:

$$R(s) = \frac{s}{Ts+1} \text{ or } R(s) = \frac{T_2^2 s^2 + 2d_s T_s s + 1}{T_1^2 s^2 + 2d_1 T_1 s + 1} - 1$$

wherein
T is the time constant,
$T_1$ is the denominator time constant,
$T_2$ is the numerator time constant,
$d_1$ is the denominator damping value, and
$d_2$ is the numerator damping value.

The parameter s relates hereby to the complex circuit frequency while the time constants T, or $T_1$, $T_2$, $d_1$ and $d_2$ are used to parameterize the frequency behavior of the high-pass elements. Feedback elements of this type operate in lower frequency ranges by differentiation, i.e., they display high-pass characteristics and allow an adequate phase margin for the control circuit.

Of course, other feedback elements may also be used. In the exemplified embodiment of FIG. 1, the feedback elements R1 and R2 are realized as band-pass elements, while the feedback element R3 is implemented as differential element DT1 having a first-order delay.

For specific phase margins it may be necessary to include additional filters in the feedback element, for example low-pass or notch filters.

The parallel control structure shown provides easy set up of the mechanism. Initially feedback elements can be deactivated, the feedback elements R2 and R3 for example. Only the feedback element R1 is activated, and correspondingly parameterized. Once the feedback element R1 has been parameterized, the feedback element R2 is additionally activated and parameterized. Activation and parameterization of the feedback element R3 follows thereafter.

Instead of taking the actual shaft position $X_{p\_actual}$ as feedback value, it is also possible to use suitable sensors or measuring systems to directly measure shaft acceleration, or to use the directly measured actual shaft speed $V_{p\_actual}$. If the acceleration is selected as the input variable in place of the actual shaft position $X_{p\_actual}$, then the actual shaft speed $V_{p\_actual}$ can be calculated through integration, and supplied to the feedback elements or, in the event that the provision of an additional integrator is not desired, proportional elements (PT1) having first-order delay, or proportional elements (PT2) having second-order delay can be used in place of the DT1 or DT2 feedback elements, and the measured acceleration can be supplied directly to the PT1 or PT2 elements. The transfer functions of such elements are well known in the art, and therefore a further discussion thereof is omitted for the sake of simplicity.

Instead of an explicit measurement of the acceleration of the shaft, it is also conceivable to calculate the shaft acceleration through second-order differentiation of the actual position value $X_{p\_actual}$ and to subsequently supply it as input variable to the PT1 elements or PT2 elements.

If the actual shaft speed $V_{p\_actual}$ is taken as the input value in place of the actual position value $X_{p\_actual}$, the differentiating element 5 can be eliminated.

Of course, it is not necessarily required to use only one measurement variable, e.g. actual position value, actual speed and acceleration of the shaft, as input variable of the control elements; Rather, it is also possible to use, e.g. actual position value and acceleration of the shaft simultaneously as controlled variables, or variables calculated therefrom as input variables. The actual position value of the shaft is, for example, supplied to a first set of feedback elements as input variable, and the acceleration is supplied to a second set of feedback elements as input variable. A set of feedback elements is hereby comprised of at least one feedback element. Basically, any desired combination of input variables is possible.

Furthermore, the parallel control structure depicted allows a simple set up of the machine. For example, the feedback elements R2 and R3 can initially be deactivated, with only feedback element R1 activated and correspondingly parameterized. Once the feedback element R1 has been parameterized, the feedback element R2 is additionally activated and parameterized. Activation and parameterization of the feedback element R3 follows thereafter.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claim is:

1. A method of damping mechanical oscillations of at least one shaft of a machine tool, manufacturing machine or robot, said method comprising the steps of:
    measuring an actual position Value of a shaft using at least one sensor and/or measuring system;
    determining an actual speed of the shaft from the actual position value through differentiation;
    supplying the actual speed of the shaft as an input signal to each of a plurality of feedback elements; and
    tuning each of the feedback elements to a specific oscillation frequency range of the shaft oscillations that is to be damped, each feedback element providing an output signal that is negatively coupled arid applied to a desired speed signal of a motor speed controller of a driving motor.

2. The method of claim 1, wherein each of the feedback elements is a band-pass or high-pass element.

3. The method of claim 1, wherein each of the feedback elements is differential element with first-order delay or a differential element with second-order delay or higher order.

4. A method of damping the mechanical oscillations of at least one shaft of a machine tool, manufacturing machine or robot, said method comprising the steps of:
    determining an actual acceleration of a shaft by using at least one sensor and/or measuring system;
    supplying the actual acceleration of the shaft as an input signal to each of a plurality of feedback elements; and
    tuning each of the feedback elements to a specific oscillation frequency range of the shaft oscillations that is to be damped, each feedback element providing an output signal that is negatively coupled and applied to a desired speed signal of a motor speed controller of a driving motor.

5. The method of claim 4, wherein each of the feedback elements is a proportional element having a first-order delay or a proportional element having a second-order or higher-order delay.

6. The method of claim 4, wherein the supplying step includes the step of determining the actual speed of the shaft from the actual acceleration through integration, wherein each of the feedback elements is a differential element having a first-order delay or a differential element having a second-order or higher order delay.

7. A method of damping the mechanical oscillations of at least one shaft of a machine tool, manufacturing machine or robot, said method comprising the steps of:
    measuring an actual position value of an shaft using at least one sensor and/or measuring system;
    determining an actual acceleration of the shaft from the actual position value through second-order differentiation;
    supplying the actual acceleration of the shaft as an input signal to each of a plurality of feedback elements; and
    tuning each of the feedback elements to a specific oscillation frequency range of the shaft oscillations that is to be damped, each feedback element providing an output signal that is negatively coupled and applied to a desired speed signal of a motor speed controller of a driving motor.

8. The method of claim 7, wherein each of the feedback elements is a proportional element with first-order delay or a proportional element with second-order delay or higher order.

9. The method of claim 7, wherein the supplying step includes the step of determining from the actual acceleration the actual speed of the shaft through integration wherein each of the feedback elements is a differential element with first-order delay or a differential element with second-order delay or higher order.

10. A method of damping mechanical oscillations of at least one shaft of a machine tool, manufacturing machine or robot, said method comprising the steps of:

determining an actual speed of a shaft by using at least one sensor and/or measuring system;

supplying the actual speed of the shaft as an input signal to each of a plurality of feedback elements; and tuning each of the feedback elements to a specific oscillation frequency range of the shaft oscillations that is to be damped, each feedback element providing an output signal which is negatively coupled and applied to a desired speed signal of a motor speed controller of a driving motor.

11. A method of damping mechanical oscillations of at least one shaft of a machine tool, manufacturing machine or robot, said method comprising the steps of:

measuring an actual acceleration of a shaft by a first type of sensor and/or measuring system;

measuring an actual speed of the shaft by a second type of sensor and/or measuring system;

supplying the actual acceleration of the shaft as an input signal to a first set of feedback elements to provide an output signal that is negatively coupled and applied to a desired speed signal of a motor speed controller of a driving motor;

supplying the actual speed of the shaft as en input signal to a second set of feedback elements to provide an output signal that is negatively coupled and applied to a desired speed signal of a motor speed controller of a driving motor; and tuning each of the feedback elements to a specific oscillation frequency range of the shaft oscillations that is to be damped, wherein each of the first and second sets of feedback elements includes at least one feedback element.

12. A method of damping mechanical oscillations of at least one shaft of a machine tool, manufacturing machine or robot, said method comprising the steps of:

determining an actual state variable of the shaft;

supplying the actual state variable of the shaft as an input signal to each of a plurality of feedback elements; and tuning each of the feedback elements to a specific oscillation frequency range of the shaft oscillations that is to be damped, each feedback element providing an output signal which is negatively coupled and applied to a desired speed signal of a motor speed controller of a driving motor.

13. The method of claim 12, wherein the determining step includes the steps of measuring an actual position value of the shaft by a measuring means, and ascertaining the actual state variable as an actual speed of the shaft obtained from the actual position value through differentiation.

14. The method of claim 12, wherein the determining step includes the steps of measuring an actual acceleration of the shaft, and ascertaining the actual state variable as an actual speed of the shaft obtained from the measured actual acceleration through integration.

15. The method of claim 12, wherein the determining step includes the step of ascertaining the actual state variable as a measured actual acceleration of the shaft.

16. The method of claim 12, wherein the determining step includes the steps of measuring an actual position value of the shaft, and ascertaining the actual state variable as an actual acceleration of the shaft obtained from the measured actual position value through second-order differentiation.

17. The method of claim 12, wherein the determining step includes the step of ascertaining the actual state variable as a measured actual speed of the shaft.

18. Apparatus for damping mechanical oscillations of a shaft of a machine tool, manufacturing machine or robot having a driving motor, comprising:

plural feedback elements, each feedback element being adapted to generate an output signal that is negatively coupled and applied to a desired speed signal of a motor speed controller of the driving motor;

measuring means for measuring a shaft variable;

means for determining an actual shaft variable from the measured shaft variable by calculation;

means for supplying the calculated shaft variable as an input signal to each feedback element; and means for tuning each feedback element to a respective oscillation frequency range of the shaft's oscillations that is to be damped.

19. The apparatus of claim 18, wherein a tuned band-pass filter is used as a feedback element for one of the oscillation frequency ranges of the shafts oscillations that is to be damped.

20. The apparatus of claim 18, wherein a tuned high-pass filter is used as a feedback element for one of the oscillation frequency ranges of the shaft's oscillations that is to be damped.

21. The apparatus of claim 18, wherein a tuned differential element having at least a first-order delay is used as a feedback element for one of the oscillation frequency ranges of the shaft's oscillations that is to be damped.

22. The apparatus of claim 18, wherein a tuned proportional element having at least a first-order delay is used as a feedback element for one of the oscillation frequency ranges of the shaft's oscillations that is to be damped.

* * * * *

UNITED STATES PATENT AND TRADEMARK OFFICE
CERTIFICATE OF CORRECTION

PATENT NO. : 6,903,529 B2
DATED : June 7, 2005
INVENTOR(S) : Stefan Künzel et al.

It is certified that error appears in the above-identified patent and that said Letters Patent is hereby corrected as shown below:

Column 6,
Line 14, replace "arid" with the correct -- and --.

Signed and Sealed this

Fourth Day of October, 2005

JON W. DUDAS
*Director of the United States Patent and Trademark Office*